US009940417B2

(12) United States Patent
Bialas, Jr. et al.

(10) Patent No.: US 9,940,417 B2
(45) Date of Patent: Apr. 10, 2018

(54) SIMULATING REFERENCE VOLTAGE RESPONSE IN DIGITAL SIMULATION ENVIRONMENTS

(71) Applicant: International Business Machines Corporation, Armonk, NY (US)

(72) Inventors: John S. Bialas, Jr., South Burlington, VT (US); Siva Pr. Boosa, Bangalore (IN); Stephen P. Glancy, Poughkeepsie, NY (US); Yelena M. Tsyrkina, South Burlington, VT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/215,757

(22) Filed: Jul. 21, 2016

(65) Prior Publication Data

US 2018/0025105 A1   Jan. 25, 2018

(51) Int. Cl.
*G06F 17/50* (2006.01)

(52) U.S. Cl.
CPC .................... *G06F 17/5022* (2013.01)

(58) Field of Classification Search
CPC ........................................................ G06F 17/50
USPC ........................................................ 716/106
See application file for complete search history.

(56) References Cited

U.S. PATENT DOCUMENTS

| 6,353,906 B1 | 3/2002 | Smith et al. |
| 6,892,171 B2 | 5/2005 | Baco |
| 8,786,347 B1 | 7/2014 | Chakraborty et al. |
| 9,009,635 B1 | 4/2015 | O'Riordan |
| 9,058,442 B2 | 6/2015 | Hollis |
| 2005/0216247 A1* | 9/2005 | Ikeda .................. G06F 17/5018 703/19 |

FOREIGN PATENT DOCUMENTS

GB   2362728 A2   11/2001

OTHER PUBLICATIONS

"Understanding Data Eye Diagram Methodology for Analyzing High Speed Digital Signals", http://www.onsemi.com/, Jun. 2015.

* cited by examiner

*Primary Examiner* — Thuan Do
(74) *Attorney, Agent, or Firm* — Patterson + Sheridan, LLP (57) ABSTRACT

Embodiments herein describe a digital simulation environment that changes the delay of a digital signal to represent different analog reference voltages. For example, changing the length of time the digital signal is at the logical one state versus the time the digital signal is at the logical zero state may represent an analog reference voltage that is below or above an optimal value. Put differently, the digital simulation environment can insert unequal delay shifts relative to the logical one and zero states of the digital signal to represent different analog voltages. Using these unequal delay shifts, a digital simulation system can test the simulated operation of logic representing a physical system that uses an analog reference voltage as an input to determine if the logic behaves as expected.

20 Claims, 8 Drawing Sheets

| VREF VALUE | DIGITAL REPRESENTATION | | | | EYE SIZE (ps) |
|---|---|---|---|---|---|
| | RISING EDGE DELAY (ps) | FALLING EDGE DELAY (ps) | PERCENT TIME AS A "1" (2400) | PERCENT TIME AS A "0" (2400) | |
| NOMINAL + 3 | 60 | 40 | 45 | 55 | 376 |
| NOMINAL + 2 | 60 | 45 | 46 | 54 | 386 |
| NOMINAL + 1 | 55 | 45 | 47 | 53 | 396 |
| NOMINAL | 50 | 50 | 50 | 50 | 416 |
| NOMINAL - 1 | 50 | 55 | 51 | 49 | 406 |
| NOMINAL - 2 | 42 | 58 | 54 | 46 | 389 |
| NOMINAL - 3 | 35 | 65 | 57 | 43 | 356 |

SIMULATING REFERENCE VOLTAGE RESPONSE IN DIGITAL SIMULATION ENVIRONMENTS

BACKGROUND

The present invention relates to computer memory, and more specifically, to simulating reference voltage response in a digital simulation environment.

The introduction of double data rate fourth generation (DDR4) introduced Per DRAM Addressability (PDA) so that different dynamic random-access memory (DRAM) chips in the same DRAM module can have different parameters. That is, each chip in a group of DRAM chips (e.g., a rank) can have different parameters. Typically, PDA is used during the initial program load (IPL) when a DRAM module is booted—i.e., powered on. During IPL, the memory system can configure the parameters for each DRAM chip of the DRAM module. To do so, the DRAM module is placed in a PDA mode and the unique DRAM locations (e.g., registers) that define the parameters of each DRAM chip are programmed by using posted mode register set (MRS) commands, address inputs, and DQ data signals.

SUMMARY

One embodiment of the present disclosure is a computing system that includes at least one computer processor and memory storing a program, where, when executed by the computer processor, the program is configured to perform an operation. The operation includes generating a digital simulation environment for testing logic representing a physical system and delaying a digital signal for testing the logic using a first unequal delay shift to represent a first analog reference voltage where the first unequal delay shift changes a duration of a high cycle in the digital signal relative to a duration of a low cycle in the digital signal. The operation includes receiving updated parameters from the logic in response to providing the digital signal with the first unequal delay shift to the logic and delaying, based on the updated parameters, the digital signal using a second unequal delay shift to represent a second analog reference voltage different from the first analog reference voltage.

Another embodiment of the present disclosure is method includes generating, using one or more computer processors, a digital simulation environment for testing logic representing a physical system and delaying a digital signal for testing the logic using a first unequal delay shift to represent a first analog reference voltage, where the first unequal delay shift changes a duration of a high cycle in the digital signal relative to a duration of a low cycle in the digital signal. The method includes receiving updated parameters from the logic in response to providing the digital signal with the first unequal delay shift to the logic and delaying, based on the updated parameters, the digital signal using a second unequal delay shift to represent a second analog reference voltage different from the first analog reference voltage.

Another embodiment of the present disclosure is a computer program product for testing logic representing a physical system. The program product having computer-readable program code executable by one or more computer processors to generate a digital simulation environment for testing the logic and delay a digital signal for testing the logic using a first unequal delay shift to represent a first analog reference voltage, where the first unequal delay shift changes a duration of a high cycle in the digital signal relative to a duration of a low cycle in the digital signal. The computer-readable program code executable to receive updated parameters from the logic in response to providing the digital signal with the first unequal delay shift to the logic and delay, based on the updated parameters, the digital signal using a second unequal delay shift to represent a second analog reference voltage different from the first analog reference voltage.

BRIEF DESCRIPTION OF THE SEVERAL VIEWS OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments herein describe a simulation system for simulating and testing a memory system that includes a DRAM module with a plurality of individual DRAM chips. In one embodiment, the DRAM chips are per DRAM addressable (PDA) so that individual parameters of the chips can be different. For example, each DRAM chip may use one or more respective reference voltage (VREF) values for signals (e.g., VREFDQ, VREFCA, etc., which may be referred to as a "VREF signals") to decode received signals (e.g., data (DQ) or command/address (CA) signals). Changing the VREF value alters the vertical alignment of a signal eye (e.g., a DQ signal eye or CA signal eye) which changes the width of the eye. In one embodiment, VREF calibration is performed during the IPL when the DRAM chip is in the PDA mode, but VREF calibration can also be performed dynamically during operation of the memory system. During VREF calibration, the VREF value can be iteratively varied to identify the VREF value that results in the greatest signal eye width. For example, the signal eye width can be identified for each value of VREF, and the value of VREF corresponding to the signal eye with the greatest signal eye width can then be identified.

In one embodiment, the memory system includes a VREF calibration module which performs VREF calibration for one or more of the DRAM chips. However, before manufacturing the VREF calibration module, a designer may wish to test and validate the algorithm performed by the VREF calibration module to ensure the algorithm accurately identifies the optimal (i.e., ideal) value of VREF for the DRAM chip or chips. One problem with simulating the function of the VREF calibration module is that VREF is an analog voltage, and thus, typically cannot be modeled in a digital simulation environment. Although an analog simulation environment could be used, analog simulation tools take orders of magnitude more time to execute than their digital counterparts. The embodiments herein describe techniques for representing an analog reference voltage in a digital simulation environment using digital delays which can vastly decrease the length of time required to validate the operation of the VREF calibration module relative to using an analog simulation environment.

In one embodiment, the digital simulation environment changes the delay of a DQ signal to represent the current VREF value. For example, changing the length of time the DQ signal is at the logical one state versus the time the DQ signal is at the logical zero state may represent a VREF value that is below the optimal value. Put differently, the digital simulation environment can insert unequal delay shifts relative to the logical one and zero states of the DQ signal to represent different VREF values. Using the unequal delay shifts, a digital simulation system can test the simulated operation of the VREF calibration module (i.e., the hardware description language (HDL) representing the calibration module) to determine if the calibration module behaves as expected—i.e., identifies the optimal VREF value.

In one embodiment, the digital simulation system may use an X-state to generate the unequal delay shifts which represent different VREF values. The X-state can be used in a digital simulation system to model a parameter that is not initialized properly or a bus is at a tri-state if data is not currently being driven on the bus. However, in this example, the X-state can create an unequal delay between the logical one and zero states to simulate the effects or response of different VREF values on the DQ signals.

Figure 1:
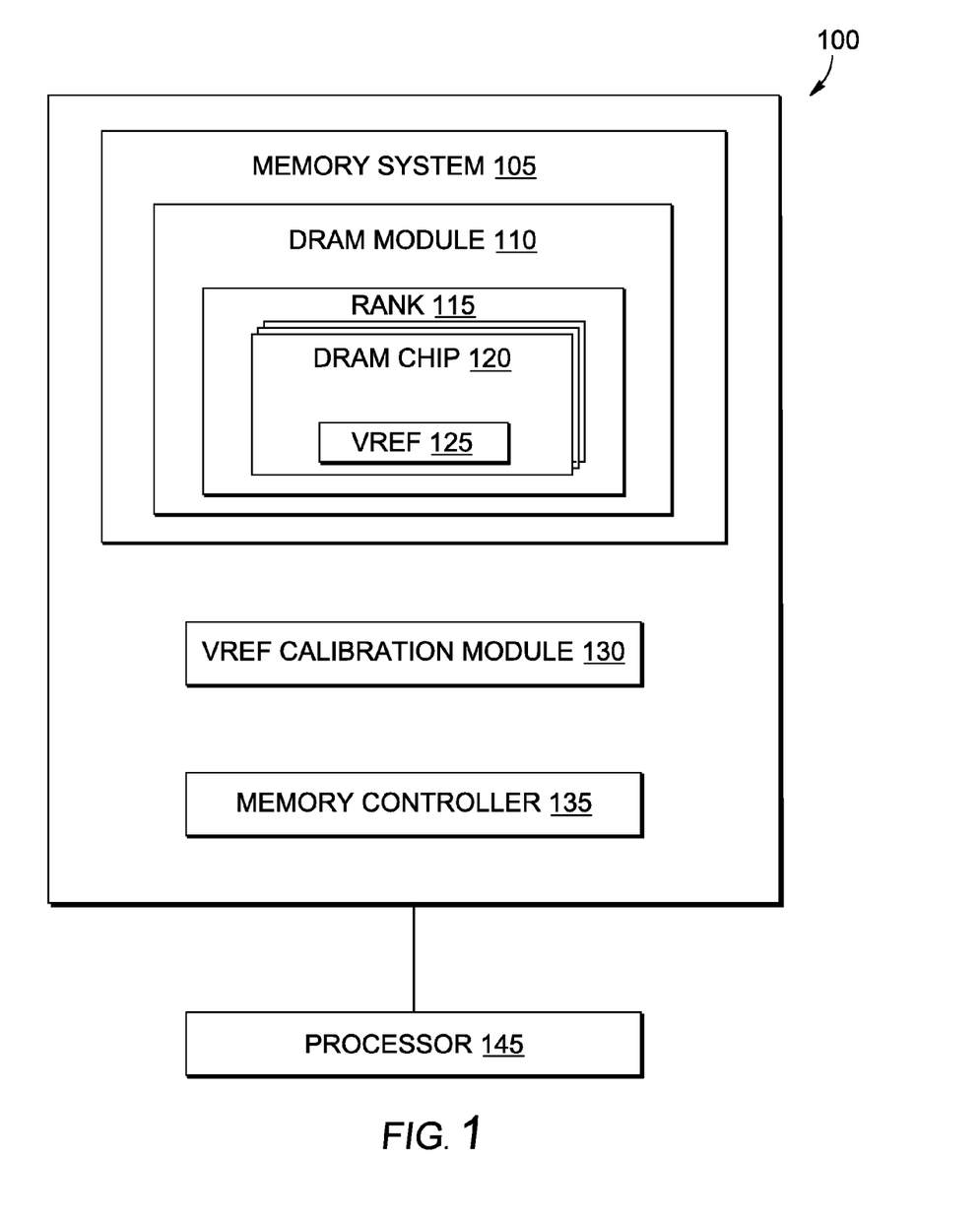
FIG. 1 is a block diagram of a memory system with a dynamic reference voltage, according to one embodiment described herein.

FIG. 1 is a block diagram of a computing system 100 with a VREF value 125 (e.g., as stored in a register), according to one embodiment described herein. The computing system 100 includes a memory system 105 and a processor 145. During runtime, the processor 145 transmits read requests to the memory system 105 to retrieve data stored in the memory system 105 and transmits write requests to the memory system 105 to store data in the memory system 105. Although FIG. 1 illustrates a single processor 145, the processor 145 can represent any number of processors that include any number of processing cores.

The memory system 105 includes a DRAM module 110, a VREF calibration module 130, and a memory controller 135. The DRAM module 110 may include a substrate (e.g., a printed circuit board) that supports multiple DRAM chips 120 organized into one or more ranks 115. In one embodiment, each rank 115 may define a row of DRAM chips 120 arranged on a common substrate. The DRAM chips 120 are individual integrated circuits that include storage elements (e.g., DRAM cells) for storing data. Each read and write request from the processor 145 includes an address (or addresses) that corresponds to a particular memory location in a particular DRAM chip 120. Once the correct DRAM chip 120 is identified, in the case of write request, storage elements in the identified chip 120 are updated to store the received data (e.g., included in the write request). In the case of a read request, storage elements in the identified chip 120 are read out to provide the requested data to the processor 145.

Each DRAM chip 120 generates a VREF value 125 that is used to decode received data (DQ) signals (and/or similarly other VREF signals used to decode received CA signals). Though the following embodiments are described with respect to DQ signals, the same principles can also be applied to other appropriate signals, such as, CA signals. In one embodiment, VREF value 125 is used as a threshold value which is compared to a DQ signal to differentiate between logical ones and zeros in the DQ signal. As recited above, the VREF value 125 may be set during IPL when the DRAM module 110 is booted or powered on. Moreover, the VREF value 125 can also be changed dynamically after the memory system 105 begins operation—i.e., during runtime.

In one embodiment, the memory system 105 uses the VREF calibration module 130 to perform VREF calibration (e.g., during IPL and/or runtime). The VREF calibration module 130 can be either hardware or firmware in the memory system 105. In one embodiment, the VREF calibration module 130 includes respective hardware or firmware within each of the DRAM chips 120. Alternatively, the VREF calibration module 130 may be disposed in the memory controller 135. Further, the calibration module 130 may be disposed on a separate integrated circuit in the memory system 105. The VREF calibration module 130 performs VREF calibration on at least one of the DRAM chips 120 to identify an optimal VREF value 125.

Although one DRAM module 110 is shown, the memory system 105 may include any number of modules 110 with any number of DRAM chips 120. Further, the DRAM chips 120 may be compatible with DDR4 which supports a PDA mode so that the VREF value 125 for each of the DRAM chips 120 can be set to different values. However, even though PDA permits the memory system 105 to change a particular VREF value 125, in other embodiments, VREF calibration can be performed on multiple chips 120 (e.g., a rank 115 or a sub-portion of the chips 120 in the rank 115) simultaneously such that the same VREF value 125 may be assigned to multiple chips 120.

Figure 2:
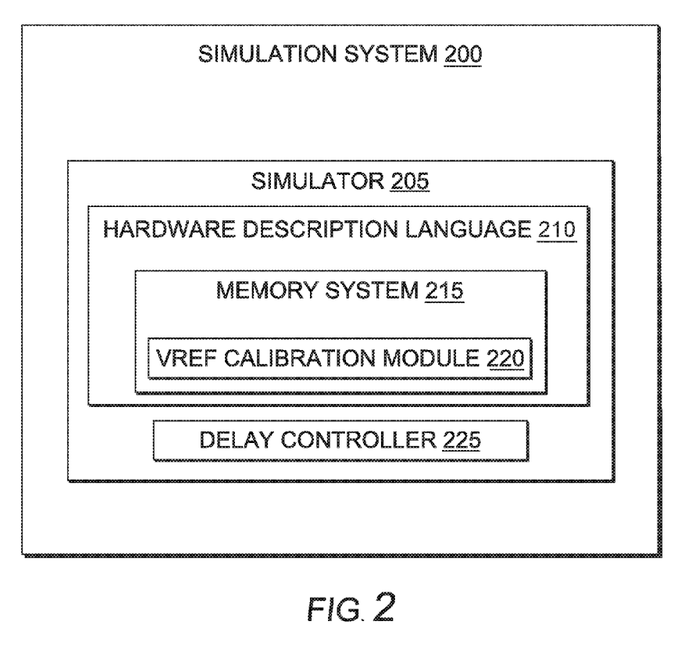
FIG. 2 is a block diagram of a simulation system for testing logic for adjusting an analog reference voltage, according to one embodiment described herein.

FIG. 2 is a block diagram of a digital simulation system 200 for testing logic for adjusting an analog reference voltage, according to one embodiment described herein. The simulation system 200 includes a digital simulator 205 and a delay controller 225. Although not shown, the simulation system 200 may include a computing system that includes any number of processors and memory devices for performing the various functions of the simulator 205 and delay controller 225.

The simulator 205 can be a software application such as a cycle or event simulator that can simulate digital logic. In this example, the simulator 205 simulates the operation of a memory system 215 that includes a VREF calibration module 220 in a hardware description language (HDL) 210. Put differently, the digital simulation system 200 permits a system designer to test and validate the logic of the memory system 215 and the VREF calibration module 220 before these components are manufactured to form the physical memory system 110 shown in FIG. 1.

The VREF calibration module 220 defined by the HDL 210 should perform the same function as the firmware and/or hardware used to implement the VREF calibration module 130 in FIG. 1. Simulating the VREF calibration module 220 permits the designer to identify bugs or flaws in the algorithm or logic of the calibration module 220 before the HDL 210 (e.g., VHDL or Verilog) is used to generate the physical memory system 105. As described above, the memory system 215 uses the VREF calibration module 220 to identify the optimal value of VREF for one or more DRAM chips. However, the VREF calibration module 220 contains logic for adjusting an analog voltage—i.e., VREF—but the simulation system 200 is a digital simulation environment.

The delay controller 225 controls the delay of a digital signal in order to represent (or simulate) the effects or response of the analog reference voltage VREF on the digital signal. Put differently, by delaying a digital signal—e.g., a calibration signal used during VREF calibration—the delay controller 225 can simulate the effect of different values of VREF on the digital signal. The delayed digital signal can then be provided to the VREF calibration module 220 to test its operation—i.e., whether the VREF calibration module 220 generates outputs that adjust the VREF value to the optimal value. In this manner, a delayed digital signal can represent an analog signal (or the effects of an analog signal) in the digital simulation system 200.

Figure 3:
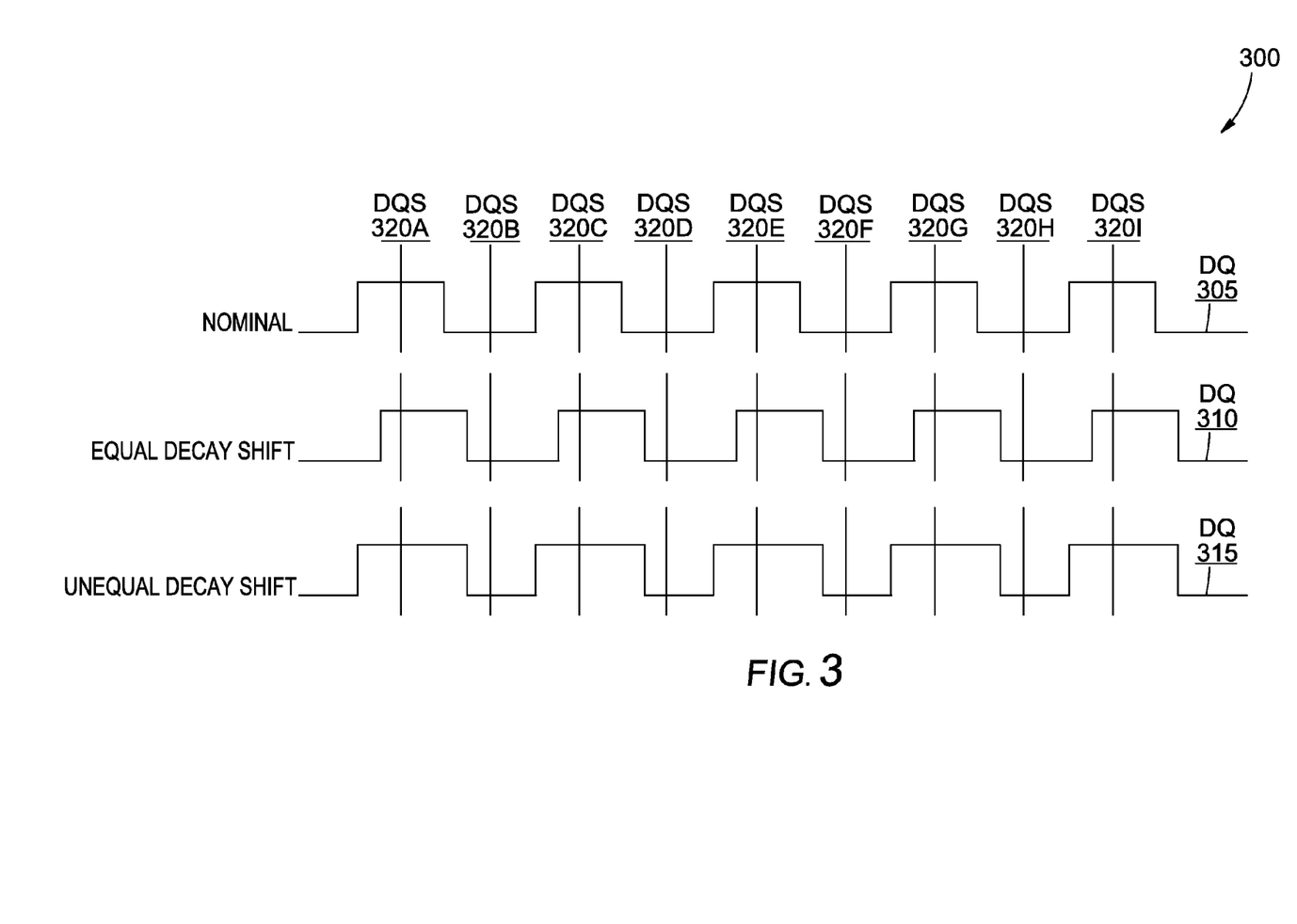
FIG. 3 is a timing diagram for adjusting delay to represent an analog reference voltage in a digital simulation environment, according to one embodiment described herein.

FIG. 3 is a timing diagram 300 for adjusting delay to represent an analog reference voltage in a digital simulation environment, according to one embodiment described herein. The timing diagram 300 illustrates three DQ signals—i.e., DQ 305, 310, and 315—which correspond to different values of VREF. Specifically, DQ 305 simulates when VREF is set at its optimal value—i.e., when the width of the DQ signal eye is the widest. The DQ strobes (DQS) 320 illustrate when the DQ signals are sampled—e.g., latched—by a memory element. Preferably, the DQS 320 should be in the middle of the HIGH and LOW cycles in the DQ signal 305. Although the DQ signal 305 is idealized in the digital simulation environment (i.e., transitions instantly between HIGH and LOW), in reality there is a slope when the DQ signals transition between the HIGH cycle (which may correspond to a logical one) and the LOW cycle (which may correspond to a logical zero). Thus, aligning the DQS 320 in the middle of each cycle increases the likelihood the memory element on the data bus will capture the correct value.

The DQ signal 310 illustrates adding an equal delay shift to both the HIGH and LOW cycles. That is, the HIGH and LOW cycles are phase shifted the same amount relative to the HIGH and LOW cycles in DQ signal 305. The equal delay shift can be used to change the time of the signal eye (i.e., the horizontal adjustment of the signal eye). In one embodiment, the delay controller can use an equal delay shift to time delay the DQ signal eye to change its width. For example, in addition to performing VREF calibration, the memory system being tested may also include a calibration module for changing the stress and hold times to identify the optimal time delay for the DQ signals. Thus, the simulator can use equal delay shifts to test the functionality of this calibration module. Adding equal delay to the rising and falling edges shifts the DQ data eye in time.

However, to simulate the effects of VREF, the delay controller can use unequal delay shifts as shown in DQ signal 315. In this example, the delay controller increases the duration of the HIGH cycle which can represent a logical one and decreases the duration of the LOW cycle which can represent a logical zero. Stated differently, the delay controller delays the falling edge of the HIGH cycle thereby increasing its duration and reducing the duration of the LOW cycle. This unequal delay shift inserts a duty cycle distortion in the DQ signal 315 which shrinks the DQ data eye. In this example, because the HIGH cycle is longer than the LOW cycle, this represents when VREF is too low—i.e., below the optimal VREF value. Conversely, if the delay controller uses an unequal delay to cause the LOW cycle to be longer than the HIGH cycle, this represents when VREF is too high. By driving these DQ signals, the simulator can test the response of the VREF calibration module. That is, the simulator can test to determine if the VREF calibration module outputs control signals to raise the value of VREF in response to receiving the DQ signal 315 where VREF is below the optimal value.

Although DQ signal 315 illustrates changing the duration of both the HIGH and LOW cycles, in one embodiment, the delay controller may change the duration of only one of the cycles. For example, the delay controller may increase the delay of the falling edge of each duty cycle to increase the duration of the HIGH cycle without changing the duration of the LOW cycle. As above, increasing the duration of the HIGH cycle relative to the duration of the LOW cycle (regardless if the duration of the LOW cycle is changed relative to the optimal DQ signal 305) may represent a VREF value that is below the optimal value. Conversely, increasing the duration of the LOW cycle relative to the duration of the HIGH cycle (regardless if the duration of the HIGH cycle is changed relative to the optimal DQ signal 305) may represent a VREF value that is above the optimal value.

Using equal and unequal delay shifts, the simulator can shift the DQ data eye (or CA data eye) along the time axis (e.g., the horizontal axis) and the VREF axis (e.g., the vertical axis). In one embodiment, the simulator sweeps the VREF values and time delay values through different combinations of these values. Stated differently, the simulator may use different combinations of the VREF values and time delay values to identify the combination that results in the signal eye with the widest width. Moreover, the VREF values and time delay values may be swept to find normalized VREF values for CA signals as well as DQ signals.

Figure 4:
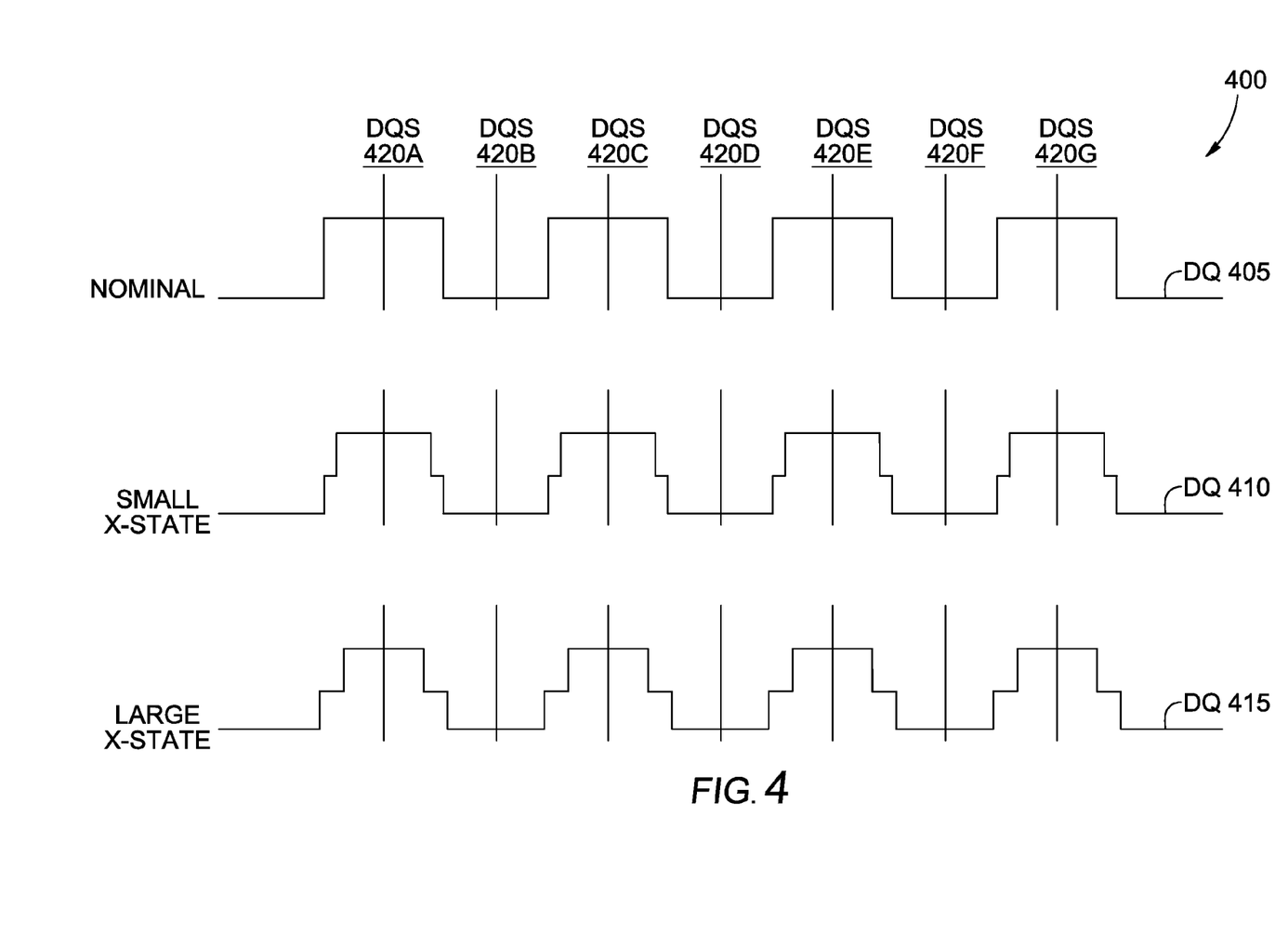
FIG. 4 is a timing diagram for adjusting delay to represent an analog reference voltage in a digital simulation environment, according to one embodiment described herein.

FIG. 4 is a timing diagram 400 for adjusting delay to represent an analog reference voltage in a digital simulation environment, according to one embodiment described herein. The timing diagram 400 includes DQ signal 405 which is similar to DQ signal 305 in diagram 300 where VREF is at its optimal value. However, DQ signal 410 and DQ signal 415 represent adding an unequal delay shift in order to change the duty cycle relative to the HIGH and LOW cycles. In this example, the delay controller uses an X-state to delay the edges of the cycles. As mentioned above, the X-state can be used to represent a component that is not initialized properly or a tri-state or unknown value. In this scenario, the delay controller inserts the X-state into the DQ signal 415 such that the duration of the HIGH cycle is decreased relative to the duration of the LOW cycle which represents the case when VREF is above its optimal value. Put differently, the time the DQ signal 410 is in the X-state shrinks the duration of the HIGH cycle more than the duration of the LOW cycle, thereby causing an unequal delay shift between the cycles and a duty cycle distortion.

The DQ signal 415 is similar to DQ signal 410 in that adding the X-state reduces the duration of the HIGH cycle relative to the LOW cycle. However, in DQ signal 415, the X-state is longer than in DQ signal 410 which further shrinks the duration of the HIGH cycle relative to the LOW cycle. As such, DQ signal 415 can be used to represent a value of VREF that is further from the optimal value than the value of VREF represented by DQ signal 410. In this manner, by changing the duration and location of the X-states, the delay controller can insert an unequal delay shift relative to the HIGH and LOW cycles to represent a plurality of different VREF values that are above or below the optimal value.

Although DQ signals 410 and 415 illustrate changing the duration of both the HIGH and LOW cycles, in one embodiment, the delay controller may change the duration of only one of the cycles using the X-state. For example, the delay controller may reduce the duration of the HIGH cycle using the X-state without changing the duration of the LOW cycle. Reducing the duration of the HIGH cycle relative to the duration of the LOW cycle (regardless if the duration of the LOW cycle is changed relative to the optimal DQ signal 405) may represent a VREF value that is above the optimal value. Conversely, reducing the duration of the LOW cycle relative to the duration of the HIGH cycle (regardless if the duration of the HIGH cycle is changed relative to the optimal DQ signal 405) may represent a VREF value that is below the optimal value.

Figure 5:
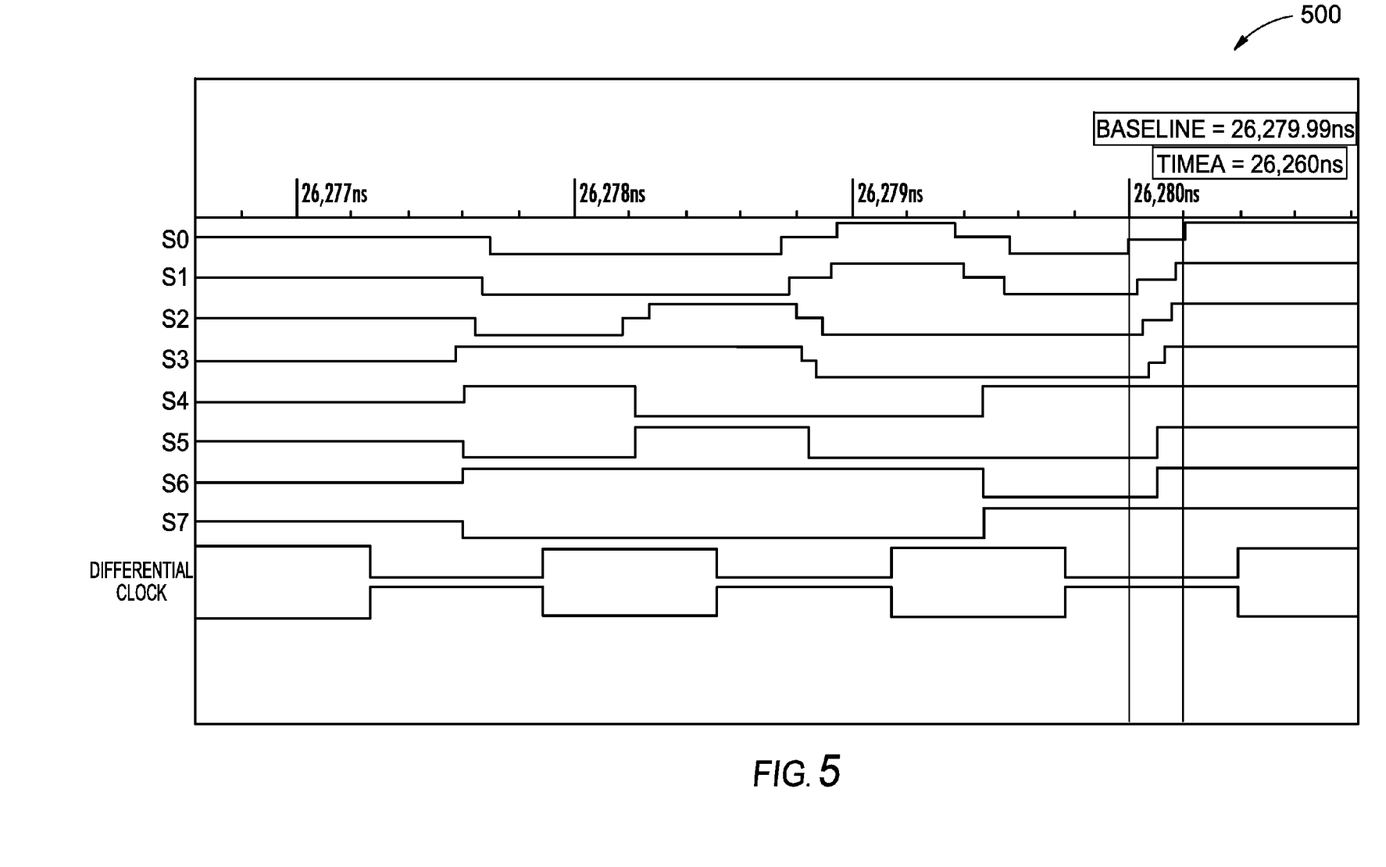
FIG. 5 is a timing diagram of different signals receiving different delays in a digital simulation environment, according to one embodiment described herein.

FIG. 5 is a timing diagram 500 of different signals receiving different delays in a digital simulation environment, according to one embodiment described herein. Diagram 500 illustrates eight signals (S0-S7). Unlike the calibration pattern followed by the DQ signals in FIGS. 3 and 4 (i.e., " . . . 1010101 . . . "), the signals S0-S7 are random. For signals S0-S3, the delay controller uses an X-state to insert unequal delay shift between the HIGH cycles and the LOW cycles, while signals S4-S7 are not delayed. Timing diagram 500 illustrates that it is possible to insert a delay using the X-state in a digital simulation environment in order to represent different values of an analog reference voltage.

Figure 6:
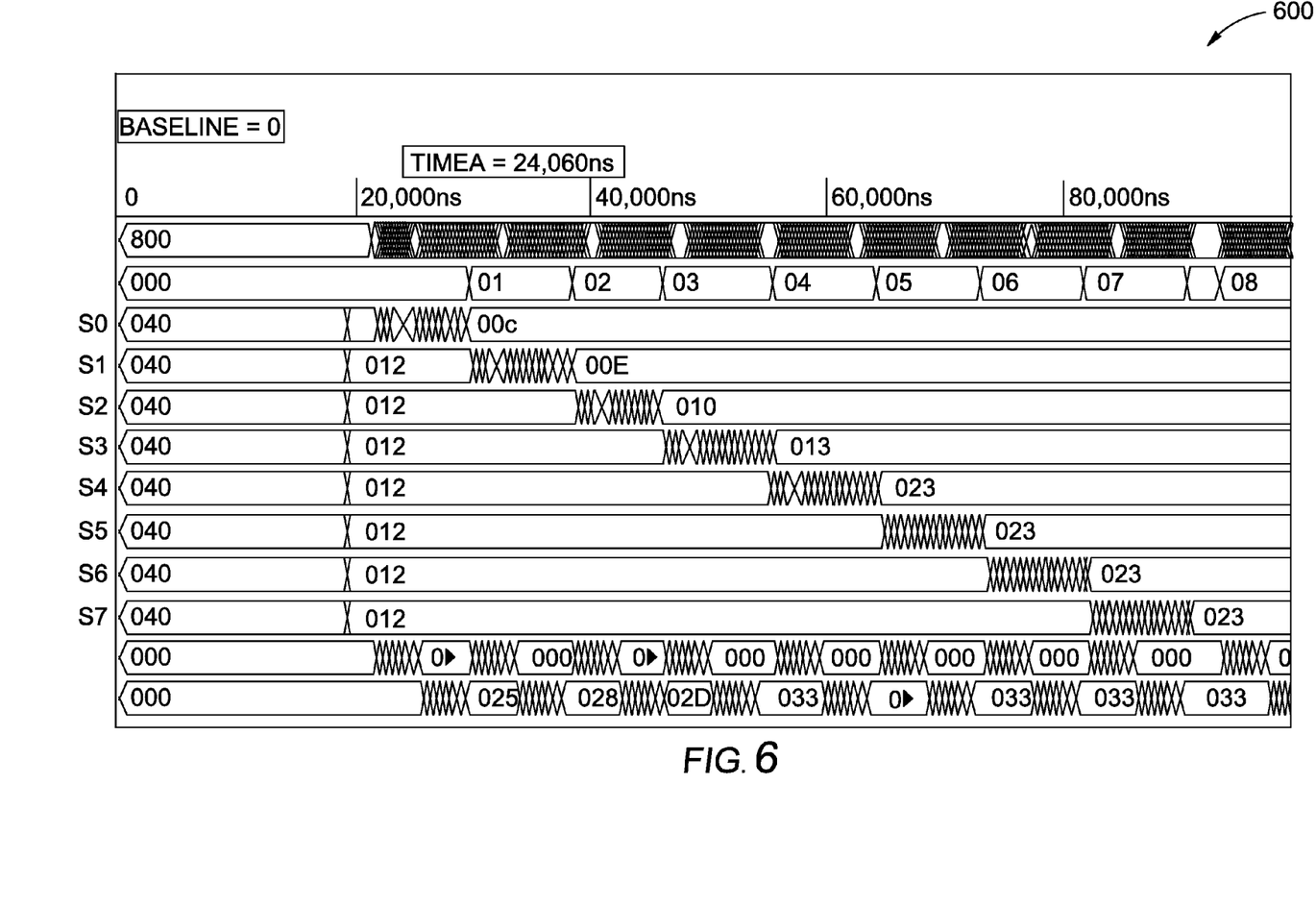
FIG. 6 is a timing diagram of a test of the reference voltage calibration module with different signals receiving different delays in a digital simulation environment, according to one embodiment described herein.

FIG. 6 is a timing diagram 600 of a test of the reference voltage calibration module with different signals receiving different delays in a digital simulation environment, according to one embodiment described herein. The timing diagram 600 includes eight calibration signals S0-S7 where bits S0-S3 are subjected to unequal delay shifts to represent different values of VREF. In contrast, signals S4-S7 are not delayed. At Time A, the calibration is initialized in the digital simulation environment. As the different signals are driven, the unequal delay shift is increased. That is, signal S0 has a smaller delay than signal S1, signal S1 has a smaller delay than S2, and so forth.

As shown, the result of the calibration for each of the signals indicates that as the delay added on the signals S0-S3 increases, the less time is needed by the VREF calibration module to identify the optimal value of VREF—i.e., identify the VREF value that generates the widest data eye. As such, timing diagram 600 illustrates that a digital simulation environment can accurately simulate an analog reference voltage by using unequal delay shifts.

Figure 7:
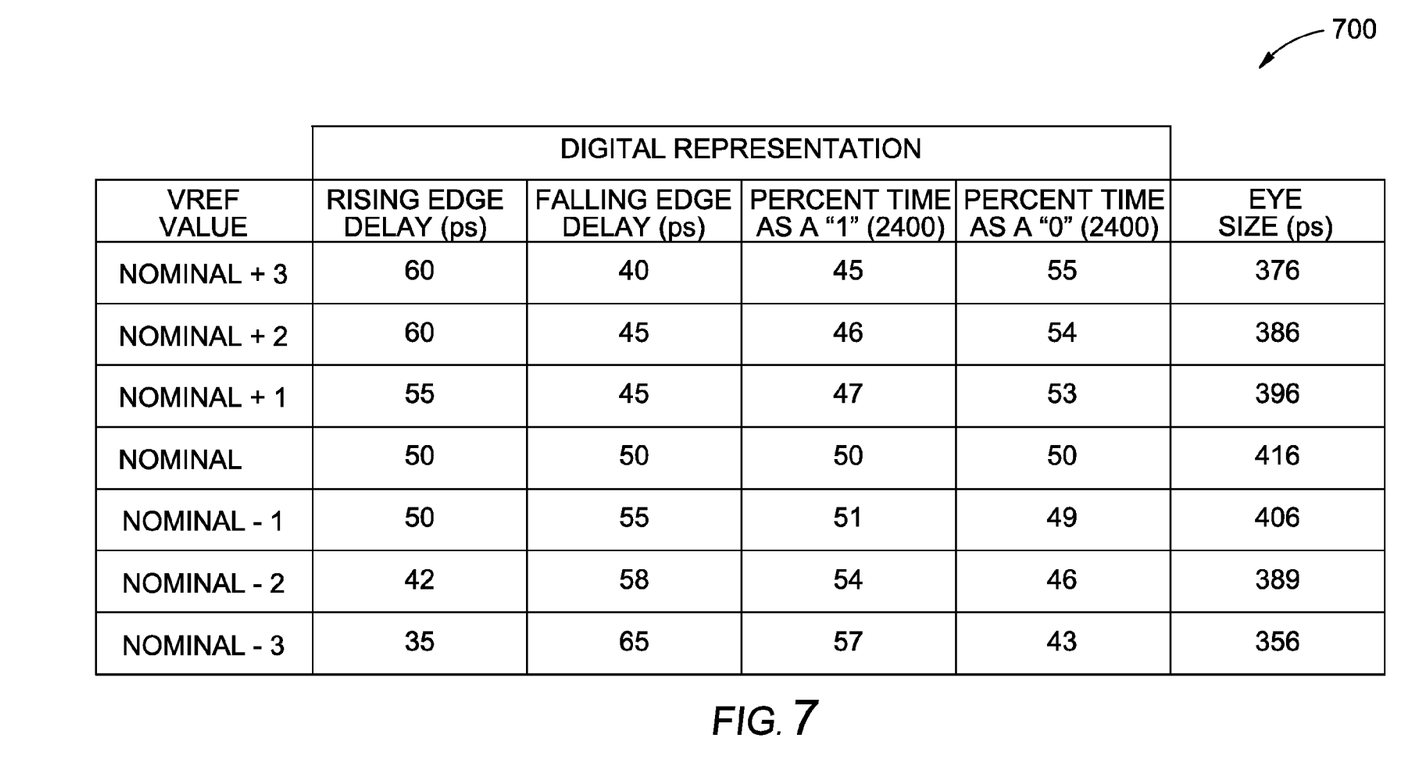
FIG. 7 is a data structure mapping analog reference voltages to their digital signal representation in a digital simulation environment, according to one embodiment described herein.

FIG. 7 is a chart 700 mapping analog reference voltages to their digital signal representation in a digital simulation environment, according to one embodiment described herein. In one embodiment, the chart 700 may be stored in memory as a data structure which can be accessed by the simulator. In one embodiment, the simulator uses the chart 700 to provide instructions to the delay controller for generating calibration signals for testing the operation of the VREF calibration module during a simulation.

The first column of chart 700 illustrates different values of VREF that vary around the optimal value. In this example, the column includes values of VREF that are greater than the optimal value as well as less than the optimal value, but this is not a requirement. Columns 2-5 represent the parameters of a digital signal representing the particular VREF value in the first columns. That is, to simulate a VREF value of optimal+3, the delay controller delays the rising edge by 60 ps and delays the falling edge by 40 ps. The resulting calibration signal is in the logical one state (e.g., the HIGH cycle) 45% of the time and in the logical zero state (e.g., the LOW cycle) 55% of the time. That is, the duration of the LOW cycle is larger than the duration of the HIGH cycle which simulates a VREF value greater than the optimal value—i.e., in this case, three units higher (where units could be any unit of voltage, e.g., 3 mV). By changing the percentages of the signal that are at the logical one state and the logical zero state, the delay controller alters a ratio between the duration of the HIGH cycle and the duration of the LOW cycle. Column 6 indicates the eye size corresponding to the delayed digital signal representing the analog reference voltage.

Using chart 700, the simulator and delay controller can generate a corresponding digital signal that represents any number of VREF values. In one embodiment, the simulator may test the logic of the VREF calibration module by sweeping through all of the VREF values in the first column to test the response of the VREF calibration module.

Figure 8:
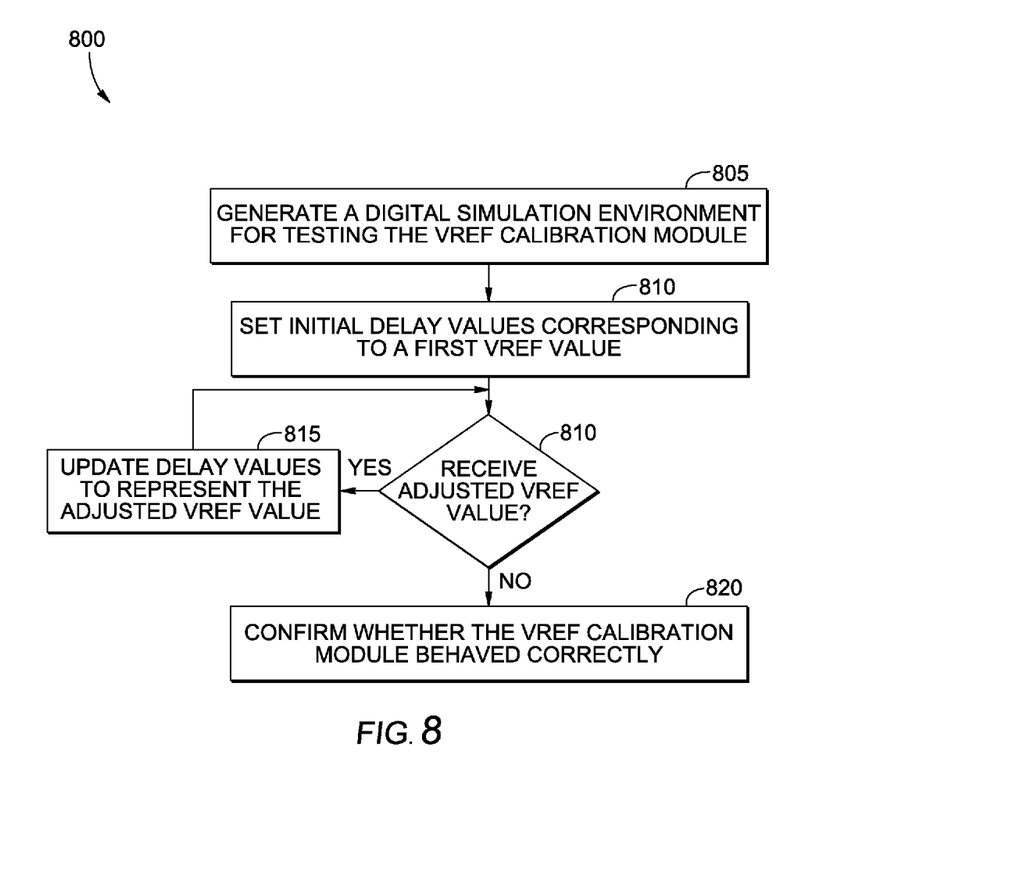
FIG. 8 is a flow chart for testing logic for adjusting the reference voltage in a digital simulation environment, according to one embodiment described herein.

FIG. 8 is a flow chart of a method 800 for testing logic for adjusting the reference voltage in a digital simulation environment, according to one embodiment described herein. At block 805, the simulation system generates a digital simulation environment for testing the logic of the VREF calibration module. Although the embodiments herein describe delaying a digital signal using unequal delay shifts to represent VREF in a DRAM system, the embodiments can be used for testing any simulated logic representing a physical system that performs an operation for evaluating an analog reference voltage.

At block 810, the delay controller sets initial delay values corresponding to a first VREF value. That is, during a simulation, the simulator may provide initial delay values to the delay controller which uses these values for generating a calibration signal for testing the logic or operation of the VREF calibration module. For example, the simulator may use the chart 700 to select the initial delay values that correspond to one of the VREF values (e.g., a first analog reference voltage).

At block 815, the simulator determines if adjusted VREF values are received. If the simulator receives an adjusted VREF value (i.e., updated parameters) from the VREF calibration module, at block 820 the simulator updates the delay values to represent the adjusted VREF value (e.g., a second analog reference voltage). In one example, the VREF calibration module performs an iterative process where the calibration module sweeps through different VREF values to determine the VREF value that results in widest DQ signal eye. Thus, it may require several iterations before all the signal eyes corresponding to the different VREF values are measured. Each time the VREF calibration module outputs instructions to adjust the VREF value to a new value, the simulator may instruct the delay controller to update the delay values to represent the effect or response of the new adjusted VREF value on the DQ signal. In this manner, the digital simulator environment can simulate a real-world scenario where the VREF calibration module outputs a command signal for adjusting the VREF until the optimal value is identified. Put differently, the VREF calibration module adjusts the VREF value until the calibration module identifies the data eye with the widest width.

Once the optimal value is reached, the simulator does not receive any adjusted VREF values from the VREF calibration module at block 815. As such, method 800 proceeds to block 825 where the simulator confirms whether the VREF calibration module behaved correctly. In one embodiment, the simulator determines if the VREF calibration module correctly identified the optimal value of VREF. In another example, the simulator may determine whether the calibration module properly swept through the different VREF values and measured the correct corresponding eye size for each of those values. If the VREF calibration module behaved correctly, the designer can proceed to other steps in the validation process in order to fabricate and manufacture a memory system containing the physical implementation of the VREF calibration module.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computing system, comprising:
   at least one computer processor; and
   a memory storing a program, wherein, when executed by the computer processor, the program is configured to perform an operation comprising:
   generating a digital simulation environment for testing logic representing a physical system;
   delaying a digital signal for testing the logic using a first unequal delay shift to represent a first analog reference voltage, wherein the first unequal delay shift changes a duration of a high cycle in the digital signal relative to a duration of a low cycle in the digital signal;
   receiving updated parameters from the logic in response to providing the digital signal with the first unequal delay shift to the logic; and
   delaying, based on the updated parameters, the digital signal using a second unequal delay shift to represent a second analog reference voltage different from the first analog reference voltage.

2. The computing system of claim 1, wherein the first and second unequal delay shifts delay at least one of rising edges and falling edges such that the duration of the high cycle is not equal to the duration of the low cycle, and wherein a first ratio between the duration of the high cycle and the duration of the low cycle corresponding to the first unequal delay shift is different than a second ratio between the duration of the high cycle and the duration of the low cycle corresponding to the second unequal delay shift.

3. The computing system of claim 1, wherein the first and second unequal delay shifts comprise an X-state, wherein inserting the X-state into the digital signal changes a ratio between the duration of the high cycle and the duration of the low cycle.

4. The computing system of claim 3, wherein a first duration of the X-state in the digital signal with the first unequal delay shift is different from a second duration of the X-state in the digital signal with the second unequal delay shift.

5. The computing system of claim 1, wherein the logic comprises a reference voltage (VREF) calibration module in a DRAM system, wherein the digital signal is a calibration signal used to test an operation of the VREF calibration module.

6. The computing system of claim 5, wherein the first analog reference voltage represents a first value of VREF that is different from an optimal value of VREF that generates a signal eye with the greatest width.

7. The computing system of claim 5, wherein the operation further comprises:
   confirming whether the VREF calibration module behaved correctly based on the updated parameters.

8. A method, comprising:
   generating, using one or more computer processors, a digital simulation environment for testing logic representing a physical system;
   delaying a digital signal for testing the logic using a first unequal delay shift to represent a first analog reference voltage, wherein the first unequal delay shift changes a duration of a high cycle in the digital signal relative to a duration of a low cycle in the digital signal;
   receiving updated parameters from the logic in response to providing the digital signal with the first unequal delay shift to the logic; and
   delaying, based on the updated parameters, the digital signal using a second unequal delay shift to represent a second analog reference voltage different from the first analog reference voltage.

9. The method of claim 8, wherein the first and second unequal delay shifts delay at least one of rising edges and falling edges such that the duration of the high cycle is not equal to the duration of the low cycle, and wherein a first ratio between the duration of the high cycle and the duration of the low cycle corresponding to the first unequal delay shift is different than a second ratio between the duration of the high cycle and the duration of the low cycle corresponding to the second unequal delay shift.

10. The method of claim 8, wherein the first and second unequal delay shifts comprise an X-state, wherein inserting the X-state into the digital signal changes a ratio between the duration of the high cycle and the duration of the low cycle.

11. The method of claim 10, wherein a first duration of the X-state in the digital signal with the first unequal delay shift is different from a second duration of the X-state in the digital signal with the second unequal delay shift.

12. The method of claim 8, wherein the logic comprises a reference voltage (VREF) calibration module in a DRAM system, wherein the digital signal is a calibration signal used to test an operation of the VREF calibration module.

13. The method of claim 12, wherein the first analog reference voltage represents a first value of VREF that is different from an optimal value of VREF that generates a signal eye with the greatest width.

14. The method of claim 12, wherein the operation further comprises:
confirming whether the VREF calibration module behaved correctly based on the updated parameters.

15. A computer program product for testing logic representing a physical system, the computer program product comprising:
a computer-readable storage medium having computer-readable program code embodied therewith, the computer-readable program code executable by one or more computer processors to:
generate a digital simulation environment for testing the logic;
delay a digital signal for testing the logic using a first unequal delay shift to represent a first analog reference voltage, wherein the first unequal delay shift changes a duration of a high cycle in the digital signal relative to a duration of a low cycle in the digital signal;
receive updated parameters from the logic in response to providing the digital signal with the first unequal delay shift to the logic; and
delay, based on the updated parameters, the digital signal using a second unequal delay shift to represent a second analog reference voltage different from the first analog reference voltage.

16. The computer program product of claim 15, wherein the first and second unequal delay shifts delay at least one of rising edges and falling edges such that the duration of the high cycle is not equal to the duration of the low cycle, and wherein a first ratio between the duration of the high cycle and the duration of the low cycle corresponding to the first unequal delay shift is different than a second ratio between the duration of the high cycle and the duration of the low cycle corresponding to the second unequal delay shift.

17. The computer program product of claim 15, wherein the first and second unequal delay shifts comprise an X-state, wherein inserting the X-state into the digital signal changes a ratio between the duration of the high cycle and the duration of the low cycle.

18. The computer program product of claim 17, wherein a first duration of the X-state in the digital signal with the first unequal delay shift is different from a second duration of the X-state in the digital signal with the second unequal delay shift.

19. The computer program product of claim 15, wherein the logic comprises a reference voltage (VREF) calibration module in a DRAM system, wherein the digital signal is a calibration signal used to test an operation of the VREF calibration module.

20. The computer program product of claim 19, wherein the first analog reference voltage represents a first value of VREF that is different from an optimal value of VREF that generates a signal eye with the greatest width.

\* \* \* \* \*